United States Patent Office 2,993,671
Patented July 25, 1961

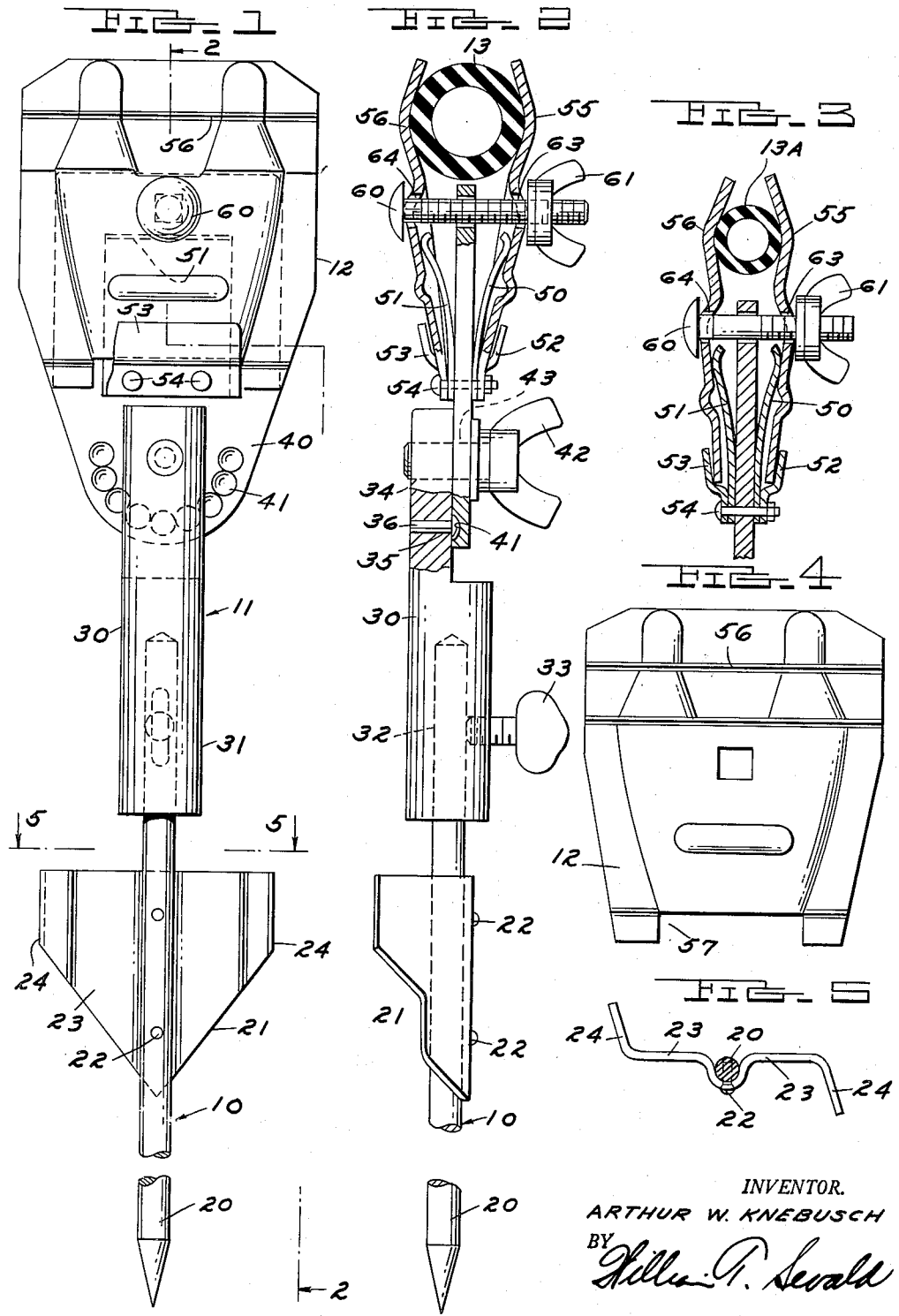

2,993,671
GARDEN HOSE STAND, ANGULARLY ADJUSTABLE FOR BOTH HORIZONTAL TRAVERSE AND VERTICAL ELEVATIONAL ANGLES
Arthur W. Knebusch, 17578 Coral Gables, Lathrup Village, Mich.
Filed June 17, 1960, Ser. No. 36,837
2 Claims. (Cl. 248—87)

This invention relates to garden hose stands and in particular to an angularly adjustable stand for both horizontal traverse and vertical elevational angles.

Garden hose stands and supports have been employed heretofore to facilitate watering lawns and shrubs, however, the several devices of prior art have not proven entirely satisfactory inasmuch as they are complicated in design, construction, expensive to manufacture, difficult to use, and are incapable of adjustable angular positioning for both horizontal traversing angles and vertical elevational angles so as to direct the water emitting from the hose as desired.

With the foregoing in view, the primary object of the invention is to provide a garden hose stand and support which is simple in design and construction, inexpensive to manufacture, easy to use and to adjust, and which has the inherent capability of being adjustable for both horizontal traversing angles and vertical elevational angles so as to render it possible for the user to adjust water emitting from the hose as desired.

An object of the invention is to provide a spear rod having a ground engaging spade portion for easy insertion in the ground and for adequate ground support to hold the rod as positioned.

An object of the invention is to provide an intermediate post pivotally adjustable for any horizontal transversing angle.

An object of the invention is to provide a center plate vertically angularly adjustably positioned on the post so as to provide for vertical angular elevational adjustments.

An object of the invention is to provide paired spring pressed jaws on the center plate which are capable of moving from a wide angle to a narrow angle so as to be fully capable of holding hoses of various diameter sizes.

An object of the invention is to provide a nut and bolt arrangement for drawing the jaws together and springs for resiliently urging the jaws apart.

An object of the invention is to provide a sperical embossment on the jaws for riding against the nut and bolt in easy moving contact.

These and other objects of the invention will become apparent by reference to the following description of a garden hose holder embodying the invention taken in connection with the accompanying drawings in which:

FIG. 1 is a side elevational view of the inventive hose holder with the spear rod foreshortened.

FIG. 2 is a cross sectional view of FIG. 1 taken on a line 1—1 thereof showing a large hose section in gripped relationship.

FIG. 3 is a cross sectional view similar to the top portion of FIG. 2 showing a small hose in gripped relationship.

FIG. 4 is an elevational view of a jaw seen in FIGS. 1 to 3; and

FIG. 5 is a cross sectional view of FIG. 1 taken on the line 5—5 thereof showing the spade conformation and shape.

Referring now to the drawing wherein like numerals refer to like and corresponding parts throughout the several views, the garden hose holder disclosed therein to illustrate the invention comprises a lower ground contacting portion 10 for insertion in the ground, and intermediate portion 11 pivotly mounted on the bottom portion 10 for traversing horizontal angles, and an upper portion 12 vertically angularly connected to the intermediate portion 11 for angularly adjusting vertical angles of elevation. It will be understood that between the horizontal adjustment of the intermediate portion 11 relative to the bottom portion 10 and vertical adjustment of the top portion 12 relative to the intermediate portion 11 that compound angles of horizontal traverse and vertical elevation can be adjusted and set on a device to hold the hose 13 or 13A in any desired compound adjusted angle.

More particularly, the bottom portion comprises a spear rod 20 and a pointed spade 21 riveted thereto by the rivets 22 and it will be noted that the spade 21 has ground contacting flanges 23 in one plane and ground contacting flanges 24 in another plane so as to support the rod 20 in all directions relative to the ground.

The intermediate portion 11 comprises a post 30 having a bottom portion 31 with a cylindrical cavity 32 housing the upper end of the rod 20 thereby pivotally mounting the post 30 on rod 20 and the thumb screw 33 threaded in the post 30 the rod 20 and holds the post 30 relative to the rod 20 in any adjusted traversing horizontal angle. The upper end of the post 30 is equipped with a threaded aperture with a serrated portion 35 such as the head of the rivet 36 for mechanically interlocking with the upper portion 12 as thereinafter more fully described.

The upper portion 12 comprises a center plate 40 having a serrated area 41 making contact with the serrated area 35 of the post 30 and an aperture axially aligned with the post aperture 34; the wing bolt 42 extends through the plate aperture 43 and is threaded in the post aperture 34 holding the plate 40 relative to the post 30 with their mutually serrated areas in contact for mechanically interlocking the vertical adjusted position of the center plate 40 relative to the intermediate post 30.

Paired torsion springs 50 and 51 are disposed on either side of the plate 40 under the paired socket clips 52 and 53 with the bolts and nuts 54 connecting the clips and springs to the center plate 40. Paired jaws 55 and 56 having bottom cut-out portions 57 are disposed on the clips 52 and 53 outside the springs 50 and 51 so that the springs resiliently urge the jaws sidewise outwardly. The plate 40 and jaws 55 and 56 have axially aligned apertures in their upper areas receiving the bolt 50 therethrough on which the nut 61 is threaded with the head of the bolt engaging one jaw and the nut engaging the other adjustably urging them together against the springs and each jaw is provided adjacent to its bolt receiving aperture with a partially spherical area 63 and 64 for providing a semi-round embossment for the bolt head and nut to ride against when the jaws move from a wide angular position such as seen in FIG. 2 to a narrow angular position such as seen in FIG. 3.

In assembling the upper portion 12 the springs 50 and 51 are located under the paired clips 52 and 53 and the bolts 54 secured therethrough. The jaws 55 and 56 are then located in the clips 52 and 53 outside the spring 50 and 51 with their cutout portion 57 socketed in the clips 52 and 53 and the bolt 60 is then disposed through the apertures of the jaws and the center plate and the nut 61 threaded on the bolt 60. The upper portion 12 is then located on the post 30 by annexing the thumb nut 42 through the aperture 43 of the upper plate 40 and threading same in the threaded aperture 34 of the post 30 and the post 30 is then disposed on the spear rod 20 and the thumb screw 33 tightened against same thereby completely assembling the device.

In operation, the jaws 55 and 56 in their upper portions provide an easy hand grip for pushing the spear rod 20 and spade 21 into the ground thereby firmly embedding the spade 21 and post 20 supporting the post from all angles. The hose 13 or 13A is then placed between the jaws 55 and 56 and the nut 61 drawn up on the bolt 60 until the jaws grip the hose. The horizontal traverse angle is then adjusted by loosening the thumb screw 33 and turning the post 30 relative to the rod 20 and then tightening the thumb screw 33 in the adjusted angular traverse position. The wing bolt 42 is then loosened and the upper portion 12 pivoted on the bolt 42 slipping the mating serrations 35 and 41 until the proper elevational angle is achieved and the thumb bolt 42 is then tightened securing the device in the adjusted vertical angular position.

The inventive hose holder with the features described constitutes a compact, durable, and neat appearing mechanism easily operated to hold a hose in any desired adjusted angle of traverse and elevation so as to render it possible for the gardner to direct the water emitting from the hose at any desired compound angle.

Although but a single embodiment of the invention has been shown and described in detail it is obvious that many changes may be made in the size, shape, detail, and arrangements of the various elements of the invention within the scope of the appended claims.

I claim:

1. A garden hose holder angularly adjustably securable for horizontal traverse and for vertical elevation comprising a spear rod for manual insertion in the ground, a spade flange on said rod insertable in the ground with said rod; said spade preventing relative rotation of said rod relative to the ground and providing a relatively large ground contact area for supporting said rod upright on all sides relative to the ground; said rod extending above said spade so as to lie substantially vertical above the ground; a vertical post having a lower end with a hollow chamber rotatably disposed on said rod for angular traverse adjustment, a thumb screw in said post contacting said rod securing said post in adjusted angular traverse relative to said rod, a head on said post having a threaded aperture and a serrated area, a center plate having a first aperture axially aligned with said post head aperture and a serrated area in contact with said post head serrated area, a wing bolt abutting said center plate threaded in said head aperture urging said plate and head together in clamped condition with said mutually contacting serrated areas mechanically interlocking; said center plate being elevationally angularly adjustable relative to said post by loosening said wing bolt to unlock said serrations; paired clips on either side of said plate forming paired sockets, paired jaws on either side of said plate having lower cut out portions resting in said sockets and upper arcuate grip portions extending above said plate for gripping and holding a hose therebetween, paired springs secured under said clips urging said jaws outwardly; said jaws and plate having aligned transverse apertures adjacent the top of said plate below said jaw grip area, a bolt disposed through said aligned apertures having a head abutting on said jaw, and a nut on said bolt contacting said other jaw; said bolt and nut being tightened drawing said jaws together to press against a hose in said jaw arcuate grip area; said jaws having partial spherical embossments contacting said bolt head and nut providing a ball-like riding contact in opening and closing said jaws over a wide range; said device being capable of holding and supporting a hose at any desired compound angle of traverse and elevation.

2. A garden hose holder angularly adjustably securable for horizontal traverse and for vertical elevation comprising a spear rod for manual insertion in the ground, a spade flange on said rod insertable in the ground with said rod; said spade having radial flanges in one plane and tangential flanges in another plane preventing relative rotation of said rod relative to the ground and providing a relatively large ground contact area for supporting said rod upright on all sides relative to the ground; said rod extending above said spade so as to lie substantially vertical above the ground; a vertical post having a lower end with a hollow chamber rotatably disposed on said rod for angular traverse adjustment, the thumb screw in said post contacting said rod securing said post in adjusted angular traverse relative to said rod, a head on said post having a threaded aperture and a serrated area, a center plate having a first aperture axially aligned with said post head aperture and a serrated area in contact with said post head serrated area, a wing bolt abutting said center plate threaded in said head aperture urging said plate and head together in clamped condition with said mutually contacting serrated areas mechanically interlocking; said center plate being elevationally angularly adjustable relative to said post by loosening said wing bolt to unlock said serrations; paired clips on either side of said plate forming paired sockets, paired jaws on either side of said plate having lower cut out portions resting in said sockets and upper arcuate grip portions extending above said plate for gripping and holding a hose therebetween, paired springs secured under said clips urging said jaws outwardly; said jaws and plate having aligned tranverse apertures adjacent the top of said plate below said jaw grip area, a bolt disposed through said aligned apertures having a head abutting one said jaw, and a nut on said bolt contactings said other jaw; said bolt and nut upon being tightened drawing said jaws together to press against a hose in said jaw arcuate grip area; said jaws having partial spherical embossments contacting said bolt head and nut providing a ball-like riding contact in opening and closing said jaws over a wide range; said device being capable of holding and supporting a hose at any desired compound angle of traverse and elevation.

References Cited in the file of this patent

UNITED STATES PATENTS

| | | |
|---|---|---|
| 2,077,668 | Bristol | Apr. 20, 1937 |
| 2,738,941 | Laurich | Mar. 20, 1956 |

FOREIGN PATENTS

| | | |
|---|---|---|
| 667,352 | Great Britain | Feb. 27, 1952 |